Aug. 3, 1926.
J. J. MOJONNIER
1,594,546
OVERRUN TEST AND APPARATUS FOR ACCOMPLISHING THE SAME
Filed June 4, 1918   2 Sheets-Sheet 1
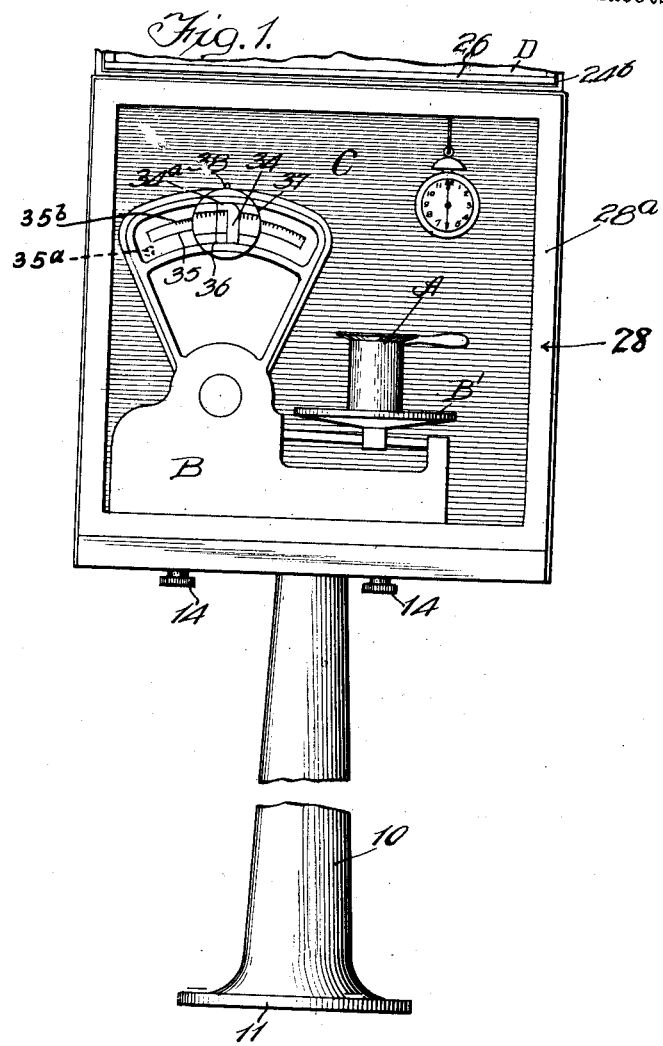
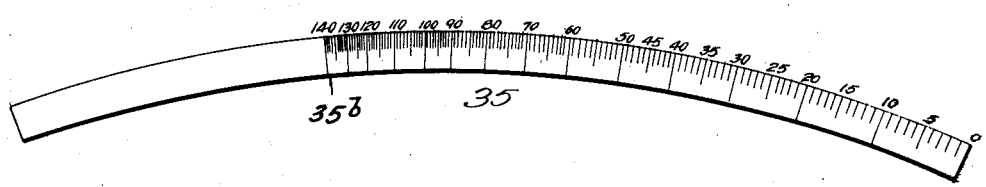

Aug. 3, 1926.
J. J. MOJONNIER
1,594,546
OVERRUN TEST AND APPARATUS FOR ACCOMPLISHING THE SAME
Filed June 4, 1918   2 Sheets-Sheet 2
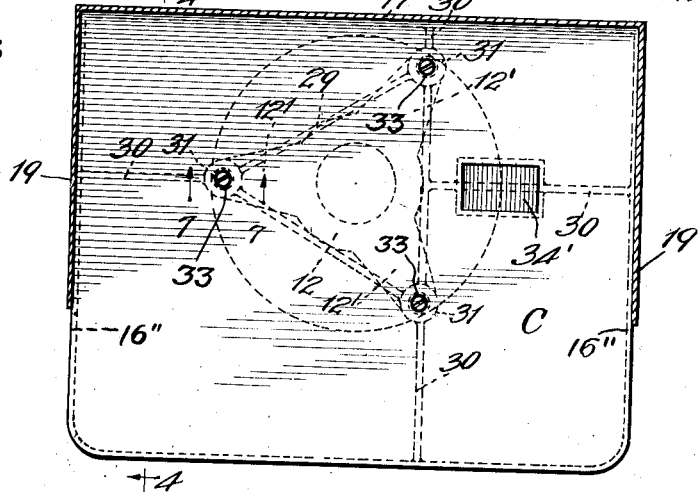
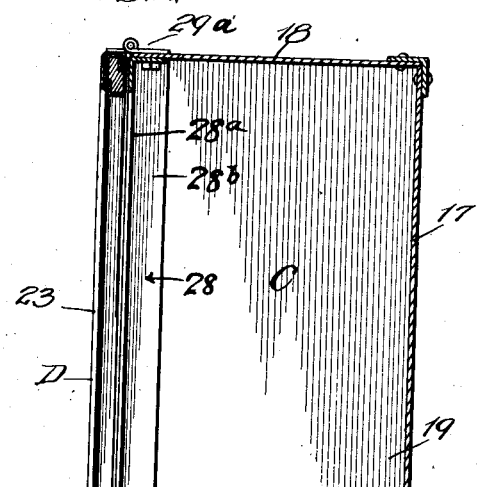
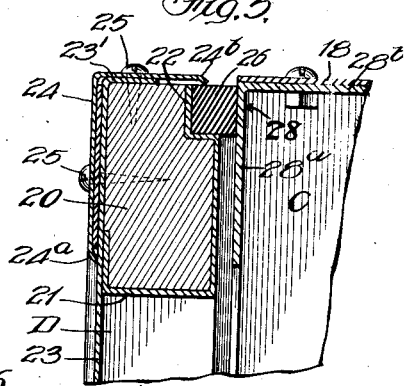
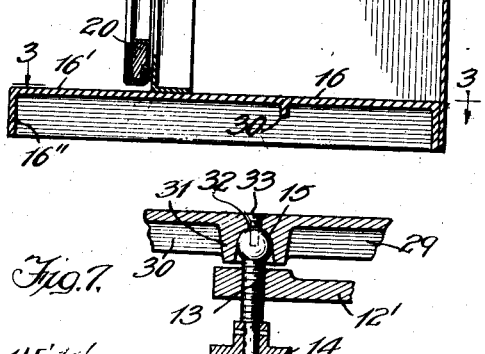
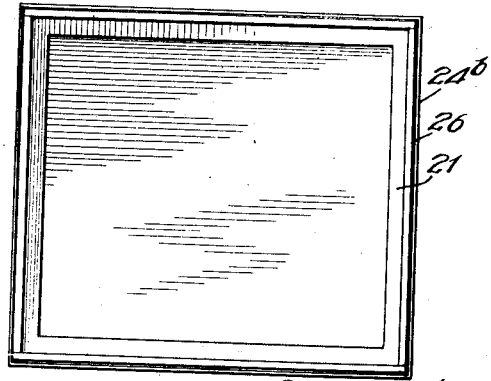
Witnesses:
W. F. Kilroy
Harry P. L. White
Inventor:
Julius John Mojonnier
By Charles S. Wilson
Atty.

Patented Aug. 3, 1926.

1,594,546

UNITED STATES PATENT OFFICE.

JULIUS JOHN MOJONNIER, OF OAK PARK, ILLINOIS, ASSIGNOR, BY MESNE ASSIGNMENTS, TO MOJONNIER BROS. CO., OF CHICAGO, ILLINOIS, A CORPORATION OF ILLINOIS.

OVERRUN TEST AND APPARATUS FOR ACCOMPLISHING THE SAME.

Application filed June 4, 1918. Serial No. 238,184.

This invention relates to an overrun test, and the apparatus for accomplishing the same, it being the object thereof to provide an accurate method of determining the percentage of air in ice cream, and an apparatus for carrying out this method which will indicate such percentage of air in ice cream directly, without any additional calculations.

With the above and other objects in view, as will be apparent, this invention consists in the method hereinafter more fully described and claimed and in the apparatus for carrying out the method consisting of the construction, combination and arrangement of parts, all as hereinafter more fully described and claimed, and illustrated in the drawings, wherein—

Fig. 1 is a front elevation of the apparatus designed for carrying out the method forming a part of the present invention, illustrating the same open;

Fig. 2 is an enlarged elevation of the scale dial and graduations used upon the balance or scale forming a part of the present apparatus;

Fig. 3 is a plan view of the bottom of the cabinet forming a part of the apparatus, illustrating in dotted lines the mechanism whereby the same is supported and leveled;

Fig. 4 is a vertical section taken medially through the cabinet;

Fig. 5 is an enlarged detailed section of the door structure whereby the cabinet is closed;

Fig. 6 is an inside elevation of the door;

Fig. 7 is a fragmentary section through one of the instruments or adjusting means whereby the cabinet is leveled, being taken through line 7—7 of Fig. 3.

The present invention constitutes both an overrun test and the apparatus for accomplishing or carrying out this test. In the manufacture of ice cream, practically all of the ingredients used to make up the mix are purchased by the manufacturer by weight; whereas the produce is sold by volumetric quantity. Therefore, it is extremely desirable from the manufacturers' standpoint to produce as great a volume of the product, ice cream, as is possible from a given weight of mix; at the same time, however, it is extremely desirable and necessary that the product be maintained at a more or less uniform standard. The mix, during the course of freezing, is whipped or churned so that it includes air, thereby increasing its volume, and obviously, if the air in the product is below the predetermined standard, the volumetric quantity of the product is necessarily reduced, resulting in a loss to the manufacturer; whereas, if the quantity of air in the product equals the predetermined standard or exceeds it, the result is a saving or increased profit to the manufacturer. Manifestly, therefore, an accurate determination of the percentage of air in ice cream is a necessity to the manufacture and results in a uniform product and in saving and increased profits to the manufacturer.

The apparatus used in carrying out the method for accomplishing this test is illustrated in the drawings and comprises a pedestal 10 having a base 11 at the lower end thereof which rests upon the floor or other suitable support, and the spider 12 at its upper end, which consists of the three horizontally radiating arms 12'. Through the outer end of each arm 12' is transversely threaded a set screw, the lower end of which is provided with a knurled head 14, while at its upper end it terminates in a ball 15. It is upon the three balls 15 of the three set screws 13 that the cabinet rests and is adjustably supported, whereby the level thereof may be regulated.

This cabinet C comprises a metallic base 16 upon which is secured by rivets or otherwise the casing of the cabinet, which consists of the rear wall 17, the top wall 18 and the side walls 19, all of said walls being secured together in any suitable manner to constitute a single unit. The side walls 19 and the top wall 18 are less in width than the depth of the bottom 16 so that when the casing of the cabinet C is mounted upon and secured to the bottom 16, an extension or shelf 16' is provided at the front of the cabinet. The front of the casing, made up of the rear wall 17, side walls 19 and top wall 18 is closed by a door D which comprises a rectangular open frame 20 of wood or other suitable material (see Fig. 5), the inner surfaces of which are covered by the metal casing 21 which is provided in its rear face, adjacent to its edge, with a continuous recess or depression 22. The outer vertical surface of this frame 20 rests flush against and has secured thereto the door plate 23, the edges of which are bent over as at 23' to embrace the frame 20. An exterior L-shaped metallic clamping member 24 embraces the door plate 23 and the exterior surfaces of the frame 20 to which it is secured by means of the screws 25. The edges of this L-shaped clamping member 24 are bent in as at 24ᵃ and 24ᵇ, in the first instance to rest and bear against the door plate 23, and in the second instance to extend over and co-operate with the continuous recess or depression 22 aforesaid. In this recess or depression 22, which extends completely around the outer edge of the inner vertical surface of the frame 20 and the casing 21 enclosing the inner surfaces thereof, is mounted a rectangular strip 26 of rubber or other suitable moistureproof resilient material, held in place by the bent-in edge 24ᵇ of the clamping member 24. Between the top wall 18 and the upper edge of the door D are one or more hinges 29ᵃ whereby the door may be permitted to swing about a horizontal pivot to obtain access to the interior of the cabinet C.

In order to provide a bearing for the rubber pad or strip 26 when the door is closed, the outer edges of the side walls 19, the top wall 18, and the body of the bottom 16 surrounding the door opening, co-operate with a rectangular frame 28 constructed of an angle iron created by the arms 28ᵃ and 28ᵇ. The arm 28ᵇ of this frame 28 rests flush against the bottom 16 and the side walls 19 and the top wall 18, whereas the remaining arm 28ᵃ of the frame 28 extends into the door opening and rests co-planar with the edges of the side walls 19 and the top wall 18, thereby providing a surface against which, when the door D is in the position illustrated in Fig. 4, bears the waterproof resilient strip 26. From the foregoing it is clear that when the door is closed a substantial waterproof seal is created between the cabinet C and the door D, preventing the moisture, which permeates the atmosphere of the freezer room of an ice cream plant, from entering the interior of the cabinet.

On the under side of the bottom 16 of the cabinet C, and located directly under the cabinet, and not under the shelf or extension 16', is a triangular rib 29 from the apexes of which extend the bracing ribs 30, said ribs extending to a depending wall 16" formed around the edge of the bottom 16 and extending laterally therefrom. The rib 29 and the ribs 30 are formed integrally with the bottom 16. At the junctions between the apexes of the triangular rib 29 and the ribs 30 are formed the sockets 31 in which are received the balls 15 of the set screws 13. Each socket 31 is tapered to readily admit of a ball 15 and is apertured as at 32 at its bottom in order that a screw 33 may pass through the bottom of the socket and be threaded into the cooperating ball 15. The screw 33 of each set screw 13 is loose in its aperture 32 so that the screw 33 and the ball 15 may rotate freely in the aperture 32 and socket 31 respectively. By rotating the various screws 13 by means of the heads 14, their positions relative to the arms 12' are adjusted and as a result thereof the level of the bottom 16 of the cabinet, and consequently of the cabinet C itself, may be regulated.

Within the cabinet C is a balance B resting upon the bottom of the cabinet, the latter being recessed at 34' to receive a projecting part of the balance and thus allow the same to properly seat itself. With the exception of the indicator or finger 34 and the dial 35, this scale is a standard scale and requires no description here. The dial 35 of the scale is graduated to indicate the percentages of air in the product, and is the reverse of the ordinary scale dial. When the platform B' of the scale is empty, the indicator 34 rests to the extreme left of the dial 35, preferably against a stop 35ᵃ (Fig. 1), and the highest indicated graduation on the dial 35 is also located toward the left, the same being, in the illustrated embodiment, the marking "140" located at the point 35ᵇ. When the platform B' is weighted down and the indicator is moved toward the right of the dial 35, it reaches the extreme limit of its movement, where the "zero" indication or graduation on the scale is located. The purpose of this will become apparent when the method carried out by the present apparatus is described in detail.

The indicator or finger 34 is provided with an off-set terminal 34ᵃ which carries the hair line indicator 36 for accurately reading the graduations. In order to further facilitate the accurate reading of the graduations on the scale or dial 35 a magnifying glass 37 is secured by means of the bracket 38 to the scale B above the dial so that it may enlarge the figures of the dial 35.

A cup A is used as a part of the present apparatus for carrying out the present method, but as this cup forms the subject matter of a co-pending application Serial No. 238,163 filed simultaneously herewith and issued on February 20th, 1923, as Patent No. 1,445,789, it is unnecessary to describe the same in detail, except to say that the bottom of this cup is adjustable within the cup A so that the volumetric content thereof may be varied. In addition to this the cup is also provided with means whereby it may be weighted. As fully explained in said previously granted patent, the proper weighting is obtained by filling the handle with varying quantities of shot.

This amounts to changing the weight applied to the scale mechanism.

The method carried out by the hereinbefore described apparatus consists in first so weighting the cup A as to bring its weight up to a predetermined and given standard, as more fully set forth in my aforesaid Patent No. 1,445,789. The standard weight of the cup is such that when the empty cup and a given weight, say, 500 grams, are placed upon the platform B' of the scale and a balance established, the indicating hair line 36 will rest at the "zero" graduation. If, upon test, the weighted cup and the 500 grams do not give this "zero" indication, the weight upon the platform B must be changed, preferably by changing the amount of shot in the cup handle, until the specified balance obtains. A like adjustment of the container weight may be had with the container and 375 grams moving the indicator of the balance to the thirty three and one third graduation, or with the container and 250 grams moving the indicator to the one hundred graduation, and so on. These balances may be called "starting balances", as they must exist before the apparatus is ready for the starting of the test. When the cup is placed on the platform B' empty and without the 500 gram weight, the hair line 36 of the indicator or finger 34 will take a position on the dial 35 at the extreme left thereof the indicator 34 resting against the stop 35ª, Fig. 1. Subsequent removal of the cup from the platform B' will leave the hair line 36 in the same position since the stop 35ª prevents any movement to indicate the resulting difference in weight. When once standardized, the 500 gram weight is discarded and the cup is then filled with mix while it rests upon the platform B' of the scale or balance, until the hair line 36 of the indicator 34 arrives at the "zero" graduation of the scale or dial 35 which is at the extreme right of said dial. The cup will then contain five hundred (500) grams of mix. The bottom of the cup is then adjusted until the surface of the mix therein is flush with the upper edge or mouth of the cup. The freezing of this particular mix is then begun and as the ice cream forms the cup A previously emptied but its capacity unchanged, is, as often as desired, completely filled with the ice cream being frozen, or actually frozen, and the top thereof so leveled that the volumetric content of the cup is always equal to the volume occupied by five hundred (500) grams of the original mix. Upon each occasion of filling the cup A with the ice cream, the same is placed upon the platform B' of the scale or balance B, thereby bringing the indicator to some point between "zero" at the extreme right of the dial 35 and the highest graduation in the left hand part thereof. In view of the fact that the same volume of ice cream always weighs less than an equal volume of mix, the further the finger or indicator 34 is from "zero" on the scale 35 the greater will be the percentage of air in the ice cream. This percentage of air is directly proportionate to the actual loss of weight between the original mix and the frozen product. The graduations of the scale have been mathematically determined in percentages, working from "zero" at the right of the dial to the maximum graduation at the left of the dial.

It at once becomes apparent, therefore, that when the cup filled level with ice cream is placed upon the platform B', its weight being less than the weight of the mix, which on the scale 35 would be "zero", brings the indicator to some point to the left of "zero." The distance between the location of the indicator and the "zero" indication of the scale or dial 35 is the loss of weight between the original mix and the same volumetric quantity of ice cream. The further the indicator 35 is from "zero" the greater the loss of weight and the greater the percentage of air. Hence, by having the figures of the scale 35 represent direct percentages, it is possible to absolutely and definitely determine the percentage of air in ice cream made from a given mix by placing the cup A upon the scale and reading the percentage directly from the scale. As clearly shown in Fig. 2, this scale is not graduated with equidistant markings. In other words, equal distances on the scale do not have equal values in percentage. This is true, for the reason that the inflation or swell in the product is measured in terms of a variable, not in terms of a constant. In the latter case equal distances would represent equal values. The variable in question is the weight of the product, and such weight varies from time to time as the inflation continues and the tests are made.

Overrun is the ratio of the difference in weight between equal volumes of the uninflated mix and the inflated product, to the weight of the same volume of the inflated product. In other words, overrun is the ratio of the weight of a given volume of the mix minus the weight of the same volume of the product, to the last mentioned weight. Or again, overrun is a measure of the difference between the weights of equal volumes of the substance uninflated and inflated, expressed in terms of the lesser of the two weights. It may be expressed in percentage or otherwise. Mathematically, it is expressed in percentage by the formula:

$$P \text{ equals} \frac{m-n}{n} \text{ times } 100$$

where P equals percentage of overrun, and $m$ and $n$ are, respectively, the weights of equal volumes of the mix and product.

As illustrative of the scale, if it be assumed that a given volume of the mix or uninflated substance weighs 500 grams, then with no inflation the 500 grams will move the indicator of the balance to the zero graduation, with sufficient inflation to reduce the weight of a like volume of the product to 375 grams, the 375 grams will move the indicator of the balance to the thirty-three and one-third graduation, and with a further inflation sufficient to reduce the weight to 250 grams, there will be a balance with the indicator at the one hundred graduation, and so on.

It will be understood that the tests for overrun may be made as frequently as it seems desirable to the attendant. In case the test shows that the overrun percentage is too low, the inflation is continued. In case the test shows that it is too high, then the inflation is reduced or discontinued until the tests show that the desired percentage has been obtained.

It should also be borne in mind that other than frozen substances may be aerated or gasified in accordance with the present invention and the apparatus herein disclosed may be used for that purpose. Besides these other uses of the invention it will be apparent that many changes and alterations may made in the apparatus disclosed and certain changes may be made in carrying out the disclosed method steps without departing from the spirit and scope of the invention. I therefore aim to cover these varied uses and the possible modifications which come within the scope of the invention by the terms of the appended claims.

What is claimed is:—

1. Apparatus of the class described, including a container adapted to be exactly filled by a predetermined weight of the substance to be tested, which substance by subsequent treatment becomes inflated; scale mechanism adapted to be actuated by and in accordance with the weight of the container and its contents; and indicating means; said container, mechanism and means being so related that each time the container, exactly filled with the inflated substance, is applied to the scale mechanism, the balanced position of the indicating means will indicate the ratio of the weight of a volume of the uninflated substance minus the weight of the same volume of the inflated substance to the last named weight.

2. Apparatus of the class described, including a container for holding at different times different substances to be tested, which substances by subsequent treatment become inflated, said container being adjustable in capacity so as to be exactly filled by a predetermined weight of the particular uninflated substance under test; scale mechanism adapted to be actuated by and in accordance with the weight of the container and its contents; and indicating means; said container, mechanism and means being so related, when once adjusted, that each time the container, exactly filled with the inflated substance, is applied to the scale mechanism, the balanced position of the indicating means will indicate the ratio of the weight of a volume of the uninflated substance minus the weight of the same volume of the inflated substance to the last named weight.

3. Apparatus of the class described, including a container for holding at different times different substances to be tested, which substances by subsequent treatment become inflated, said container being adjustable in weight so that it may be brought to a predetermined standard and in capacity so that the container and its contents, when the container is exactly filled with the particular uninflated substance under test, will weigh a predetermined amount; scale mechanism adapted to be actuated by and in accordance with the weight of the container and its contents; and indicating means; said container, mechanism and means being so related, when once adjusted, that each time the container, exactly filled with the inflated substance, is applied to the scale mechanism, the balanced position of the indicating means will indicate the ratio of the weight of a volume of the uninflated substance minus the weight of the same volume of the inflated substance to the last named weight.

4. Apparatus of the class described, including a container for holding at different times different substances to be tested, which substances by subsequent treatment become inflated, said container being adjustable in weight so that it may be brought to a predetermined standard and of such capacity that it may be exactly filled by a predetermined weight of the particular uninflated substance under test; scale mechanism adapted to be actuated by and in accordance with the weight of the container and its contents; and indicating means; said container, mechanism and means being so related, when once adjusted, that each time the container, exactly filled with the inflated substance, is applied to the scale mechanism, the balanced position of the indicating means will indicate the ratio of the weight of a volume of the uninflated substance minus the weight of the same volume of the inflated substance to the last named weight.

5. An automatic weighing apparatus having the usual pan or load-receiver and co-operating pointer and dial members, one of the latter being stationary and the other adapted for automatic movement from its no-load position by a weight, applied to the pan, a distance proportional to such weight, said dial being so calibrated that its zero point will be indicated with a predetermined weight on the pan, and the numbering of points indicated by lesser weights being such that the number of any particular lesser-weight point will be equal to the quotient, obtained by dividing the difference between the said greater or predetermined weight and the lesser weight corresponding to the point by such lesser weight.

6. Apparatus of the class described, including a container having a predetermined weight and a capacity so adjusted as to equal the volume of a predetermined weight of the substance to be tested, which substance becomes inflated under subsequent treatment, mechanism adapted to be actuated by and in accordance with the weight of the container and its contents, and means including a member controlled by said mechanism, when the latter is actuated by the container exactly filled with the inflated substance, to indicate the ratio of the difference between the predetermined weight of the substance uninflated and of the weight of the same volume of the substance inflated to the last named weight, the predetermined weights of the container empty and also exactly filled with the uninflated substance being factors fixing the calibration of the indicating mechanism.

7. Apparatus of the class described, including a container adapted for measuring the volume of a predetermined weight of the substance to be tested, which substance by subsequent treatment becomes inflated, scale mechanism adapted to be actuated by and in accordance with the weight of the container and its contents, and means, including a member controlled by said mechanism, when actuated by the container having therein a volume of the inflated substance equal to the measured volume of the uninflated substance, for indicating upon each test the ratio of the weight of the measured volume of the uninflated substance minus the weight of the same volume of the inflated substance to the last named weight.

8. A method of determining the overrun in ice cream by using a scale having its graduations designated in percentages with the minimum graduation at what normally in a scale is the maximum graduation, said method consisting in determining the volume occupied by a quantity of mix, the weight of which, with that of its container, is sufficient to bring the indicator of said scale to the minimum graduation, replacing the mix in the container with a like volume of the frozen product and noting the percentage designation to which the indicator moves upon placing the refilled container on said scale.

9. A weighing apparatus having the usual pan or load-receiver and cooperating weight-indicating members, one of said members being calibrated and another of said members being movable along said calibrated member from its no-load position, the distance of movement from the no-load position to obtain a balance being porportional to the weight applied to the pan in each case, the calibrations of said calibrated member being so located that when said movable member is at the zero point a predetermined weight in the pan will be balanced, and the numbering of points corresponding the lesser weights being such that the number of any particular lesser-weight point will be equal to the quotient obtained by dividing the difference between the greater or predetermined weight and the lesser weight corresponding to the point of such lesser weight.

10. Apparatus of the class described, including a container for holding substances to be tested, which substances under treatment become inflated, scale mechanism adapted to be actuated by and in accordance with the weight of the container and its contents, indicating means, including a pointer and scale, operated by said mechanism and graduated to indicate differences between the weights of equal volumes of the substance uninflated and inflated, in terms of the lesser of the two weights, and means for compensating for differences in specific gravity of substances to be tested.

JULIUS JOHN MOJONNIER.

---

Certificate of Correction.

It is hereby certified that in Letters Patent No. 1,594,546, granted August 3, 1926, upon the application of Julius John Mojonnier, of Oak Park, Illinois, for an improvement in "Overrun Tests and Apparatus for Accomplishing the Same," an error appears in the printed specification requiring correction as follows: Page 5, line 80, claim 9, before the article "the" insert the word *to;* and that the said Letters Patent should be read with this correction therein that the same may conform to the record of the case in the Patent Office.

Signed and sealed this 12th day of October, A. D. 1926.

[SEAL.]

M. J. MOORE,
*Acting Commissioner of Patents.*